(12) United States Patent
Sudo

(10) Patent No.: US 6,510,155 B1
(45) Date of Patent: Jan. 21, 2003

(54) ATM LAYER DEVICE CONTROLLING METHOD AND ATM LAYER DEVICE

(75) Inventor: Eiji Sudo, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/238,091

(22) Filed: Jan. 26, 1999

(51) Int. Cl.[7] .............................................. H04J 3/24
(52) U.S. Cl. ..................... 370/395; 370/395.4; 370/412
(58) Field of Search ................................ 370/230, 235, 370/236, 389, 392, 394, 395.1, 397, 395.3, 395.4, 395.42, 412, 415, 416, 419, 428, 463, 474

(56) References Cited

U.S. PATENT DOCUMENTS 5,446,738 A * 8/1995 Kim et al. ............. 370/395.42
5,485,456 A * 1/1996 Shtayer et al. ........... 370/395.1
5,889,778 A * 3/1999 Huscroft et al. ............ 370/395

OTHER PUBLICATIONS

The ATM Forum Technical Committee, Utopia Level 2, Version 1.0, af–phy–0039.000, pp. 1–66, Jun. 1995.*

* cited by examiner

Primary Examiner—Wellington Chin
Assistant Examiner—Frank Duong
(74) Attorney, Agent, or Firm—Hayes Soloway PC

(57) ABSTRACT

There is disclosed an ATM layer device configured to realize the function of an ATM layer by selecting one from a plurality of physical layer devices realizing the function of a physical layer, and executing a transfer of a cell, which is a unit of transmission, between the ATM layer device and the selected physical layer device. Priority information indicating the previously set priority level of each of said plurality of physical layer devices is held, and the physical layer device which should execute the cell transfer is selected in a predetermined order in accordance with the priority information. Thus, drops in cell transmission rate and receiving buffer overflows in the physical layer device are eliminated.

10 Claims, 7 Drawing Sheets

ATM LAYER DEVICE CONTROLLING METHOD AND ATM LAYER DEVICE

BACKGROUND OF THE INVENTION

1. Field of the Invention

The present invention relates to an ATM (Asynchronous Transfer Mode) layer device for realizing the function of an ATM layer in an ATM transmission network.

2. Description of Related Art

In an ATM transmission network adopting the B-ISDN (Broadband Integrated Services Digital Network) standard and others, a protocol for transferring information comprises a plurality of layers. Respective layers have inherent functions, and one layer is realized by utilizing the function of a layer inferior to the first named layer by one layer.

Of the plurality of layers, a lower layer, which is the most remote layer from a user's side, includes a physical layer and an ATM layer.

The physical layer is a layer for providing a resource for transferring a cell, which is a unit of information transmission. Specifically, the physical layer generates a signal format suitable for a transmission medium, receives a signal, encodes, and/or generates and eliminates a transmission frame. Furthermore, the physical layer checks whether or not the information included in the cell is effective, and transfers the cell carrying the effective information (effective cell) to the ATM layer.

The ATM layer is a layer superior to the physical layer by one layer, and executes a multiplexing and a separation of cells.

An ATM layer device, which is a device realizing the function of the ATM layer, and a physical layer device, which is a device realizing the function of the physical layer, are connected through, for example, a UTOPIA interface (an interface standard, Universal Test and Operation PHY Interface for ATM).

FIG. 7 is a block diagram illustrating the connection between the ATM layer device and the physical layer devices.

As shown in FIG. 7, "n" physical layer devices $102_1$ to $102n$ (where "n" is a positive number) are connected to an ATM layer device 101 through a UTOPIA interface. The ATM layer device 101 selects one from the "n" physical layer devices $102_1$ to $102n$, and transfers a cell between the ATM layer device and the selected physical layer device. Incidentally, the prior art ATM layer device gives an equal opportunity of selection to all the physical layer devices $102_1$ to $102n$, since a priority order is not provided among the physical layer devices $102_1$ to $102n$.

A system for equally selecting the physical layer devices $102_1$ to $102n$ includes, for example, a "round robin" scheduling. In this "round robin" scheduling system, as shown in FIG. 8, all the physical layer devices $102_1$ to $102n$ are selected in a predetermined order, as if a closed loop were depicted.

In the UTOPIA interface standard, on the other hand, since a transmission rate of the cell is not defined, a physical layer device having a high transmission rate and a physical layer device having a low transmission rate are connected to the ATM layer device in a mixed condition.

For example, consider a case in which a plurality of physical layer devices exists, each device having a low transmission rate and simultaneously receiving the cell, and in which one physical layer device having a high transmission rate exists and constantly receives the cell.

In this case, if the physical layer devices are selected in accordance with the round robin scheduling, after the ATM layer device receives the cell from the plurality of physical layer devices having the low transmission rate, the ATM layer device receives the cell from the physical layer device having the high transmission rate.

Accordingly, before the physical layer device having the high transmission rate transmits the cell to the ATM layer device, it receives a next cell, so that there is a possibility that a receiving buffer for temporarily storing the cells might overflow.

Even if the receiving buffer does not overflow, the actual transfer rate becomes smaller than the expected transfer rate because of the waiting time required for transferring the cell to the ATM layer device.

Accordingly, it is an object of the present invention to provide an ATM layer device which overcomes the above mentioned problem of the prior art.

Another object of the present invention is to provide an ATM layer device capable of preventing drops in the cell transfer rate and overflows of the receiving buffer provided in the physical layer device.

The above and other objects of the present invention are achieved in accordance with the present invention by an ATM layer device controlling method realizing the function of an ATM layer by selecting one from a plurality of physical layer devices realizing the function of a physical layer, and executing a transfer of a cell, which is a unit of transmission, between the ATM layer device and the selected physical layer device, the method including the steps of holding the priority information indicating the previously set priority level of each of the plurality of physical layer devices, and selecting the physical layer device that should execute the cell transfer, in a predetermined order in accordance with the priority information.

At this time, it is possible to output the address of the physical layer device which should execute the cell transfer, selected in accordance with the priority information, and to execute the cell transfer between the ATM layer device and the physical layer device designated by the address. Alternatively, it is also possible to output the address of the physical layer device of a candidate which should execute the cell transfer, in accordance with the priority information, and to respond to a cell transfer enable notify signal indicating that the cell transfer is possible, outputted from the physical layer device designated by the address, so as to output the address of the physical layer device that should execute the cell transfer.

Preferably, the priority is set such that the larger the transmission rate of the physical layer device, the higher the priority level of the physical layer device.

According to another aspect of the present invention, there is provided an ATM layer device configured to realize the function of an ATM layer by selecting one from a plurality of physical layer devices realizing the function of a physical layer, and executing a transfer of a cell, which is a unit of transmission, between the ATM layer device and the selected physical layer device, the ATM layer device including a priority information register holding the priority information indicating the previously set priority level of each of the plurality of physical layer devices, a selecting physical layer address output circuit for outputting the address of the physical layer device that should execute the cell transfer, in a predetermined order in accordance with the priority information, and a control circuit for executing the transfer of the cell between the ATM layer device and the physical layer device designated by the address.

In one embodiment, the ATM layer device further includes a polling physical layer address output circuit for outputting, in a predetermined order, the address of the physical layer device of a candidate that should execute the cell transfer, selected in accordance with the priority information, and wherein the selecting physical layer address output circuit responds to a cell transfer enable notify signal indicating that the cell transfer is possible, outputted from the physical layer device designated from the address, so as to output the address of the physical layer device that should execute the cell transfer.

Preferably, the selecting physical layer address output circuit can include a plurality of priority control registers for holding the information of the physical layer devices in units of different levels of priority, and the polling physical layer address output circuit can include a plurality of priority control registers for holding the information of the physical layer devices in units of different levels of priority.

Furthermore, it can be set such that the larger the transmission rate of the physical layer device, the higher the priority level of the physical layer device.

With the above mentioned arrangement, the ATM layer device in accordance with the present invention holds the priority information indicating the previously set priority level of each of a plurality of physical layer devices, and selects the physical layer device that should execute the cell transfer, in a predetermined order in accordance with the priority information. Therefore, the higher the priority level of the physical layer device, the larger the opportunity for selection of the physical layer device becomes, so that the data transfer amount per unit of time of a physical layer device having a high priority level can be increased.

The above and other objects, features and advantages of the present invention will be apparent from the following description of preferred embodiments of the invention with reference to the accompanying drawings.

DESCRIPTION OF THE PREFERRED EMBODIMENTS

Figure 1:
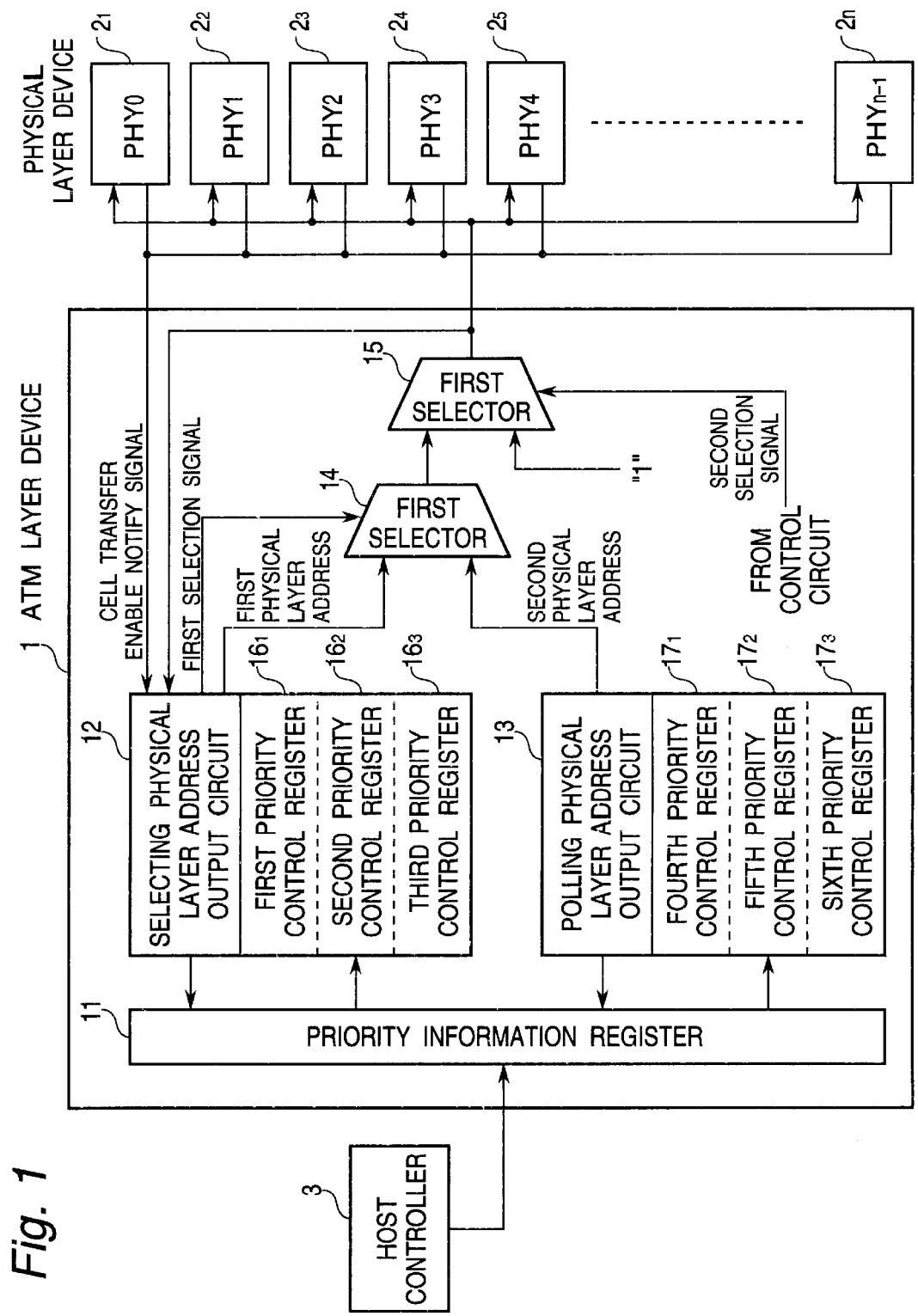
FIG. 1 is a block diagram illustrating the structure of an ATM layer device in accordance with the present invention.

Now, the present invention will be described with reference to the accompanying drawings.

The ATM layer device in accordance with the present invention holds priority information indicating a previously set priority level of respective physical layer devices and selects a physical layer device which should execute a cell transfer, in accordance with the priority information.

In the following discussion, only circuits which are provided in the ATM layer device and which realize the function of selecting the physical layer device will be described. However, as a matter of course, the ATM layer device includes means for realizing the function of the cell multiplexing and the function of the cell separation, but since these means do not have a close relation to the present invention, these means are omitted in the drawings, and explanation thereof will be omitted.

Figure 7:
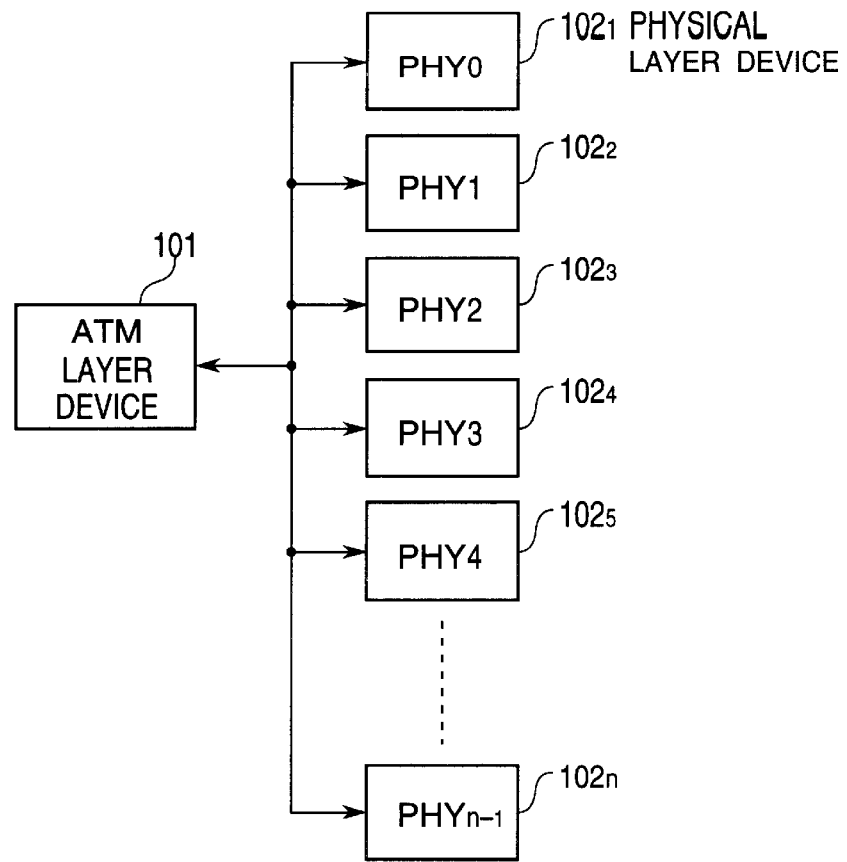
FIG. 7 is a block diagram illustrating a prior art connection between an ATM layer device and physical layer devices.
Figure 8:
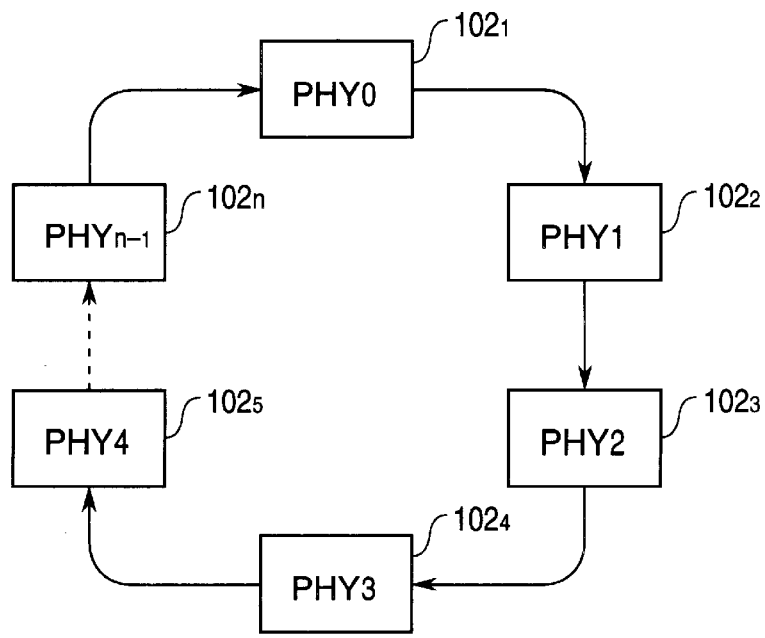
FIG. 8 is a block diagram illustrating a prior art method for selecting a physical layer device by an ATM layer device.

In addition, the connection between the ATM layer device and the physical layer vices is similar to that of the prior art (FIG. 7).

FIG. 1 is a block diagram illustrating the structure of the ATM layer device in accordance with the present invention.

As shown in FIG. 1, an ATM layer device 1 is connected to "n" physical layer devices $2_1$ to $2n$ and a host controller 3 for generating a control signal for rewriting the priority information of the physical layer devices $2_1$ to $2n$.

The ATM layer device 1 outputs the address of the physical layer device ($2_1$ to $2n$) that should execute the cell transfer, and on the other hand, each of the physical layer devices $2_1$ to $2n$ outputs a cell transfer enable notify signal indicating whether or not the corresponding physical layer device can execute the cell transfer.

The ATM layer device 1 includes a priority information register 11 for holding the priority information of the respective physical layer devices $2_1$ to $2n$, a selecting physical layer address output circuit 12 for outputting a first physical layer address, which is the address of the physical layer device that should execute the cell transfer (namely, the address of the selected physical layer device), a polling physical layer address output circuit 13 for outputting a second physical layer address, which is the address of the physical layer device that is a candidate for selection, a first selector 14 for selecting either of the first physical layer address and the second physical layer address in accordance with a first selection signal outputted from the selecting physical layer address output circuit 12, and a second selector 15 for alternately outputting the physical layer address outputted from the first selector 14 and the data "1" (of the same bit number as that of the physical layer address) in accordance with a second selection signal supplied from a control circuit (not shown), in order to output the address signal defined in the UTOPIA interface.

The selecting physical layer address output circuit 12 includes a first priority control register $16_1$ for holding the information of the physical layer devices having the highest priority, a second priority control register $16_2$ for holding the information of the physical layer devices having a middle priority, and a third priority control register $16_3$ for holding the information of the physical layer devices having the lowest priority.

Similarly, the polling physical layer address output circuit 13 includes a fourth priority control register $17_1$ for holding the information of the physical layer devices having the highest priority, a fifth priority control register $17_2$ for holding the information of the physical layer devices having a middle priority, and a sixth priority control register $17_3$ for holding the information of the physical layer devices having the lowest priority.

Figure 2:
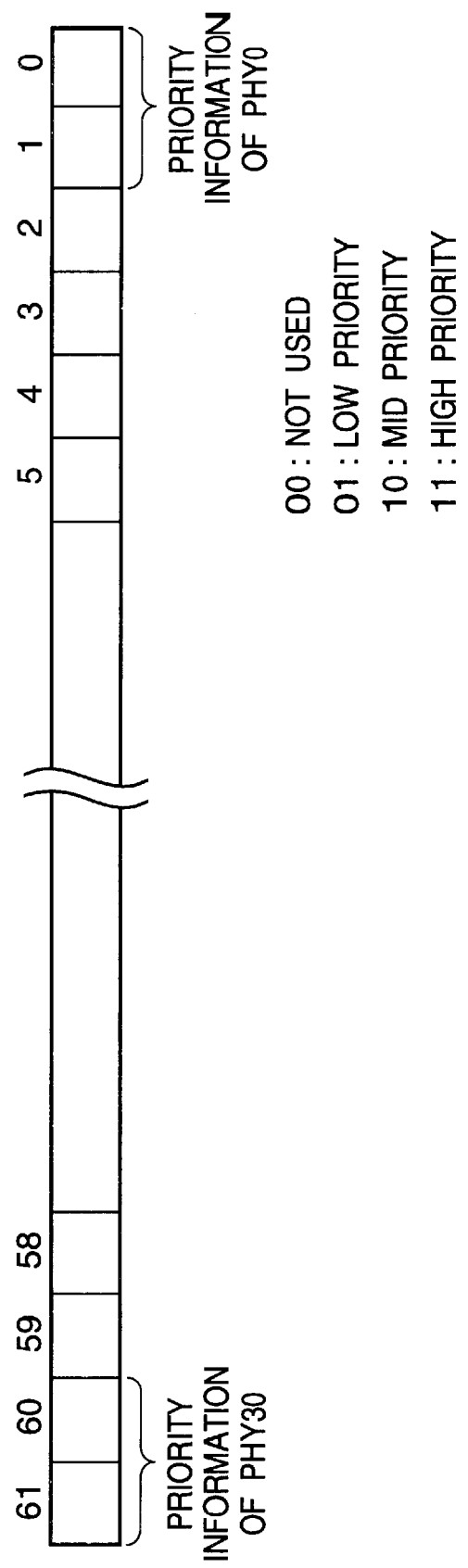
FIG. 2 is a diagram illustrating one example of the content stored in the priority information register provided in the ATM layer device shown in FIG. 1.
Figure 3A:
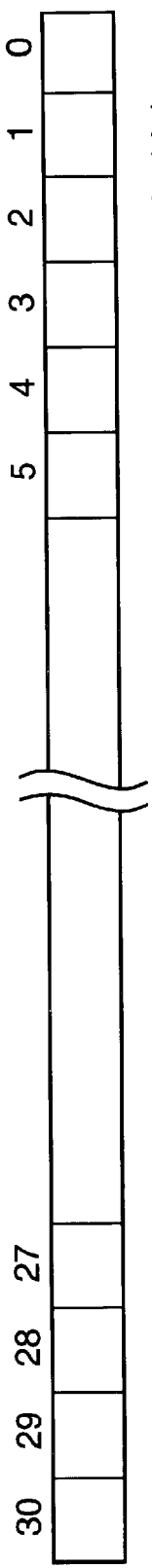
FIGS. 3A, 3B and 3C are diagrams respectively illustrating the contents of the first and fourth priority control registers, the contents of the second and fifth priority control registers, and the contents of the third and sixth priority control registers, provided in the ATM layer device shown in FIG. 1.
Figure 3B:
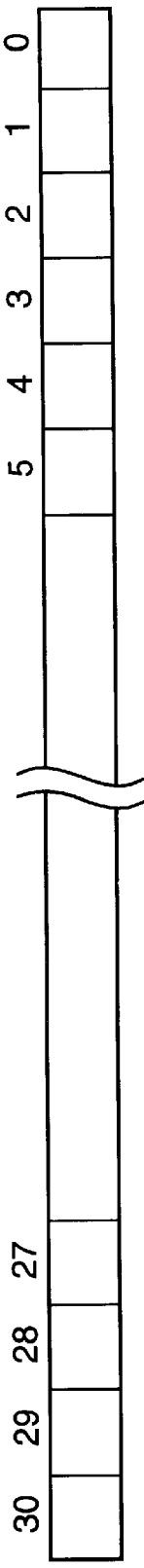
Figure 3C:
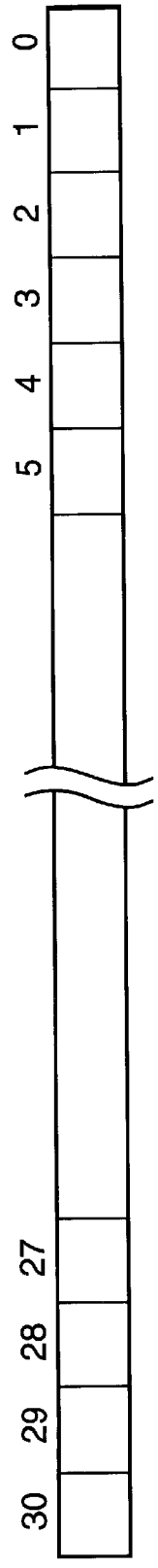

FIG. 2 is a diagram illustrating one example of the content stored in the priority information register 11 shown in FIG. 1. FIGS. 3A, 3B and 3C are diagrams illustrating the contents of the priority control registers shown in FIG. 1. FIG. 3A is a diagram illustrating the contents of the first and fourth priority control registers $16_1$ and $17_1$, FIG. 3B is a diagram illustrating the contents of the second and fifth priority control registers $16_2$ and $17_2$, and FIG. 3C is a diagram illustrating the contents of the third and sixth priority control registers $16_3$ and $17_3$.

As shown in FIG. 2, the priority information of each of the physical layer devices $2_1$ to 2n is stored in the priority information register 11 in units of two bits.

In addition, as shown in FIG. 3A, in each of the first priority control register $16_1$ and the fourth priority control register $17_1$, the data "1" is written into the bit(s) corresponding to the physical layer device(s) having the highest priority.

Similarly, as shown in FIG. 3B, in each of the second priority control register $16_2$ and the fifth priority control register $17_2$, the data "1" is written into the bit(s) corresponding to the physical layer device(s) having the middle priority. As shown in FIG. 3C, in each of the third priority control register $16_3$ and the sixth priority control register $17_3$, the data "1" is written into the bit(s) corresponding to the physical layer device(s) having the lowest priority.

Incidentally, FIG. 2 and FIGS. 3A, 3B and 3C illustrate the examples of the contents stored in the priority information register 11, the first to third priority control registers $16_1$ to $16_3$ and the fourth to sixth priority control registers $17_1$ to $17_3$ in the case having 31 physical layer devices.

The priority control registers are provided in accordance with the number of priority levels. For example, when the priority has two levels (namely, a high priority and a low priority), it is sufficient if each of the selecting physical layer address output circuit 12 and the polling physical layer address output circuit 13 includes two priority control registers.

With the above mentioned arrangement, the priority information register 11 is previously written with the priority information, as shown in FIG. 2, of the respective physical layer devices $2_1$ to 2n, by the host controller 3.

The ATM layer device 1 first outputs from the polling physical layer address output circuit 13 the second physical layer address, which is the address of the physical layer device that is a candidate for selection.

At this time, the selecting physical layer address output circuit 12 outputs the first selection signal causing the first selector 14 to output the second physical layer address. The second selector 15 alternately outputs the second physical layer address outputted from the first selector 14 and the data "1" of the bit number equal to that of the second physical layer address, in accordance with the second selection signal, so as to transmit it to the selecting physical layer address output circuit 12 and the physical layer devices $2_1$ to 2n.

The physical layer device designated by the second physical layer address outputs the cell transfer enable notify signal, indicating whether or not the cell transfer is possible, to the selecting physical layer address output circuit 12.

The selecting physical layer address output circuit 12 receives the second physical layer address outputted from the second selector 15 and the cell transfer enable notify signal outputted from the physical layer device designated by the second physical layer address, and outputs the address of the physical layer device that can execute the cell transfer (first physical layer address) and simultaneously outputs the first selection signal causing the first selector 14 to output the first physical layer address.

Next, the second selector 15 alternately outputs the first physical layer address outputted from the first selector 14 and the data "1" of the bit number equal to that of the first physical layer address, in accordance with the second selection signal, so as to transmit it to the selecting physical layer address output circuit 12 and the physical layer devices $2_1$ to 2n.

The physical layer device designated by the first physical layer address executes the cell tranfer between the physical layer device designated by the second physical layer address and a control circuit (not shown) provided in the ATM layer device.

Figure 4:
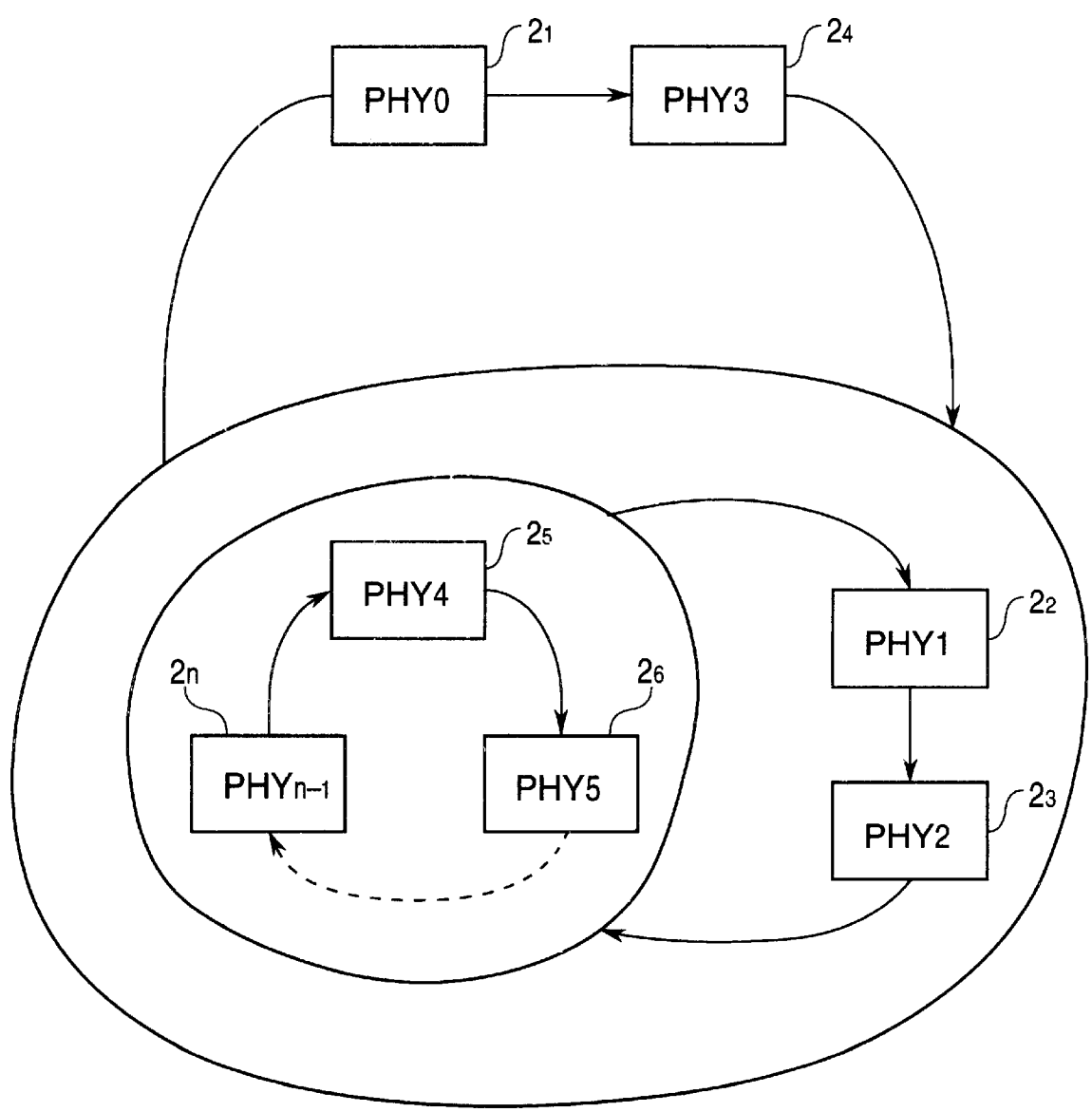
FIG. 4 is a diagram illustrating one example of a method for selecting the physical layer device by the ATM layer device in accordance with the present invention.

For example, considering the case shown in FIG. 4, the 31 physical layer devices are divided into the physical layer devices PHY0 and PHY3 having the highest priority, the physical layer devices PHY1 and PHY2 having the middle priority and the physical layer devices PHY4 to PHY30 having the lowest priority. In this case, the physical layer devices are selected in the order determined by a priority-based hierarchical combination of a loop comprising the physical layer devices having the highest priority, another loop comprising the physical layer devices having the middle priority, and still another loop comprising the physical layer devices having the lowest priority, as in the named order of PHY0, PHY3, PHY1, PHY0, PHY3, PHY2, PHY0, PHY3, PHY4, PHY0, . . .

Next, the processing procedures in the polling physical layer address output circuit 13 and the processing procedures in the selecting physical layer address output circuit 12 will be described with reference to FIGS. 5 and 6.

Figure 5:
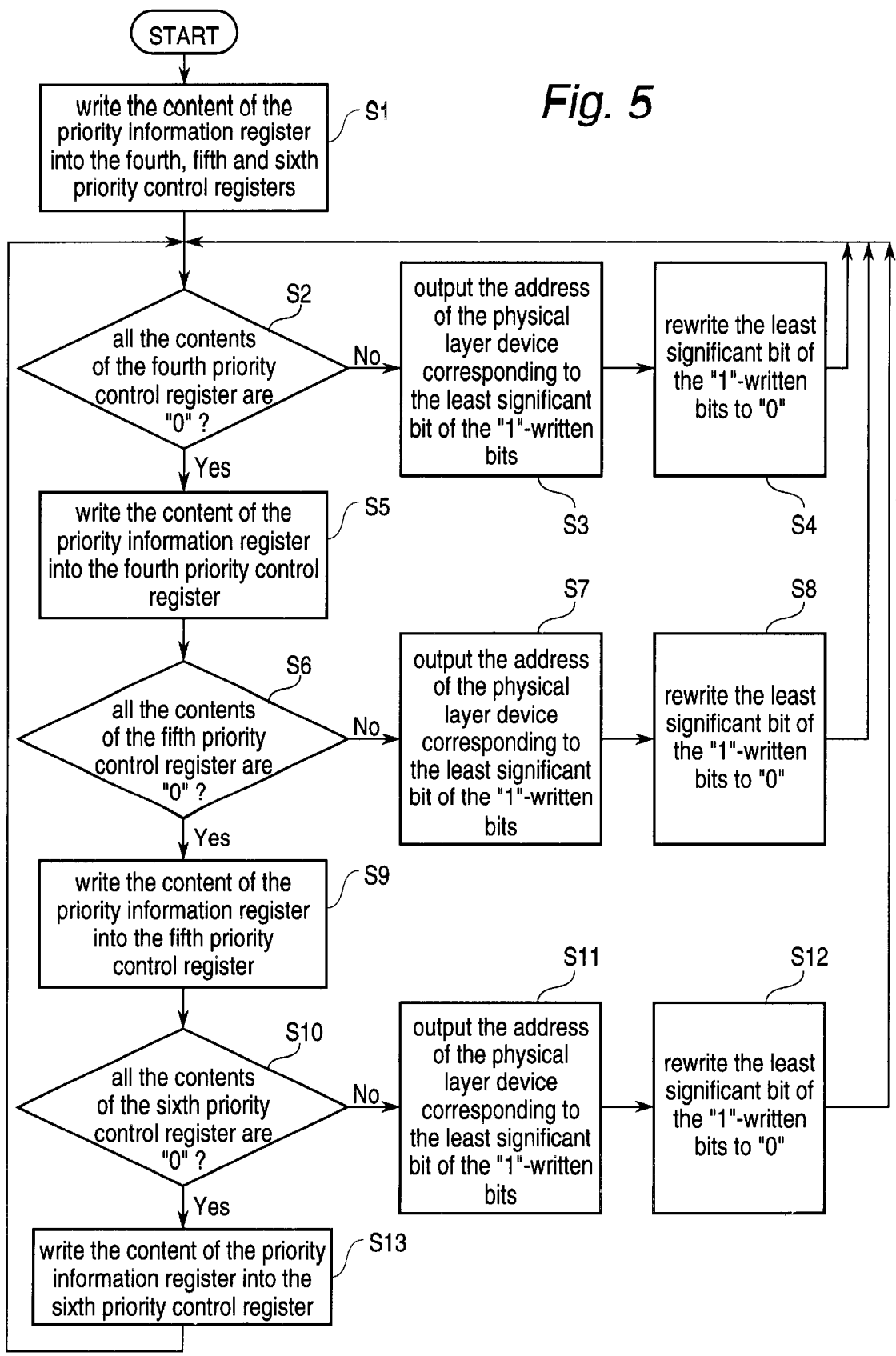
FIG. 5 is a flowchart illustrating the processing procedures in the polling physical layer address output circuit provided in an ATM layer device in accordance with the present invention.

FIG. 5 is a flowchart illustrating processing procedures in the polling physical layer address output circuit shown in FIG. 1. FIG. 6 is a flowchart illustrating the processing procedures in the selecting physical layer address output circuit shown in FIG. 1.

In the flowchart shown in FIG. 5, the polling physical layer address output circuit 13 first writes the priority information of the respective physical layer devices $2_1$ to 2n to the fourth to sixth priority control registers $17_1$ to $17_3$ on the basis of the content of the priority information register 11 (step S1).

Next, the polling physical layer address output circuit 13 ascertains whether or not all the bits of the fourth priority control register $17_1$ are "0" (step 2). If all the bits of the fourth priority control register $17_1$ are not "0", the polling physical layer address output circuit 13 outputs the address of the physical layer device corresponding to the least significant bit of the "1"-written bits in the fourth priority control register $17_1$ (the second physical layer address) (step S3).

Furthermore, the polling physical layer address output circuit 13 rewrites the bit of the fourth priority control register $17_1$ corresponding to the physical layer device selected in step S3, to "0" (Step S4), and returns to step S2, so as to repeat the processing of steps S2 to S4 until all the bits of the fourth priority control register $17_1$ become "0".

When all the bits of the fourth priority control register $17_1$ are "0" in step S2, the polling physical layer address output circuit 13 writes again the priority information of the corresponding physical layer devices ($2_1$ and $2_4$ in the example of FIG. 4) to the fourth priority control register $17_1$ on the basis of the content of the priority information register 11 (step S5).

After completion of step S5, the processing goes into step S6, in which the polling physical layer address output circuit 13 ascertains whether or not all the bits of the fifth priority control register $17_2$ are "0". If all the bits of the fifth priority control register $17_2$ are not "0", the polling physical layer address output circuit 13 outputs the address of the physical layer device corresponding to the least significant bit of the "1"—written bits in the fifth priority control register $17_2$ (the second physical layer address) (step S7).

Furthermore, the polling physical layer address output circuit 13 rewrites the bit of the fifth priority control register $17_2$ corresponding to the physical layer device selected in step S7, to "0" (step S8), and returns to step S2.

On the other hand, if all the bits of the fifth priority control register $17_2$ are "0" in step S6, the polling physical layer address output circuit 13 writes again the priority information of the corresponding physical layer devices ($2_2$ and $2_3$ in the example of FIG. 4) to the fifth priority control register $17_2$ on the basis of the content of the priority information register 11 (step S9).

After completion of step S9, the processing goes into step S10, in which the polling physical layer address output circuit 13 ascertains whether or not all the bits of the sixth priority control register $17_3$ are "0". If all the bits of the sixth priority control register $17_3$ are not "0", the polling physical layer address output circuit 13 outputs the address of the physical layer device corresponding to the least significant bit of the "1"—written bits in the sixth priority control register $17_3$ (the second physical layer address) (step S11).

Furthermore, the polling physical layer address output circuit 13 rewrites the bit of the sixth priority control register $17_3$ corresponding to the physical layer device selected in step S11, to "0" (step S12), and returns to step S2.

On the other hand, if all the bits of the sixth priority control register $17_3$ are "0" in step S10, the polling physical layer address output circuit 13 writes again the priority information of the corresponding physical layer devices ($2_5$ to $2n$ in the example of FIG. 4) to the sixth priority control register 173 on the basis of the content of the priority information register 11 (step S13). Therefore, the processing returns to step S2, so that the processing of steps S2 to S13 is repeated.

With the above mentioned processing, the polling physical layer address output circuit outputs the physical layer address in the order determined by the priority-based hierarchical combination of a high priority loop comprising the physical layer devices having the highest priority, a middle priority loop comprising the physical layer devices having the middle priority, and a low priority loop comprising the physical layer devices having the lowest priority, as shown in FIG. 4.

Figure 6:
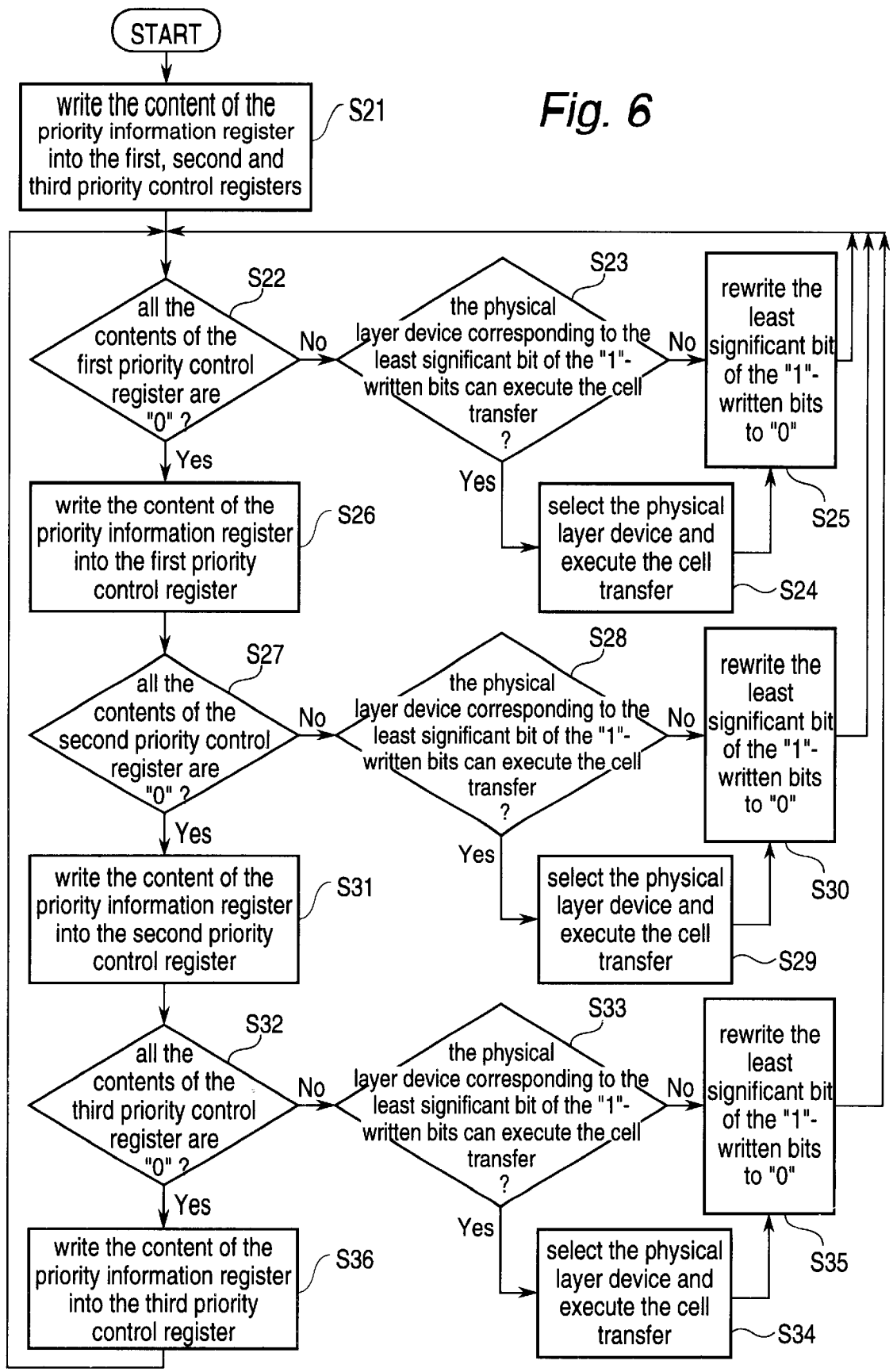
FIG. 6 is a flowchart illustrating the processing procedures in the selecting physical layer address output circuit provided in an ATM layer device in accordance with the present invention.

In the flow chart shown in FIG. 6, the selecting physical layer address output circuit 12 first writes the priority information of the respective physical layer devices $2_1$ to $2n$ into the first, second and third priority control registers $16_1$ to $16_3$ on the basis of the content of the priority information register 11 (step S21).

Then, the selecting physical layer address output circuit 12 ascertains whether or not all the contents of the first priority control register. $16_1$ are "0" (step S22). When all the contents of the first priority control register $16_1$ are not "0", the selecting physical layer address output circuit 12 ascertains whether or not the physical layer device corresponding to the least significant bit of the "1"—written bits can execute the cell transfer (step S23). Whether or not the cell transfer is executable is determined on the basis of the second physical layer address and the cell transfer enable notify signal outputted from the physical layer device designated by the second physical layer address.

When the result of the processing in step S23 indicates that the cell transfer is possible, the selecting physical layer address output circuit 12 outputs the address of the corresponding physical layer device (first physical layer address) so that the cell transfer is executed between the ATM layer device and the corresponding physical layer device (step S24). On the other hand, when the cell transfer is not possible or when the processing in step S24 is completed, the selecting physical layer address output circuit 12 rewrites the least significant bit of the "1"—written bits in the first priority control register $16_1$ to "0" (step S25), and the processing returns to step S22, so that the processing of steps S22 to S25 is repeated until all the contents of the first priority control register $16_1$ becomes "0".

On the other hand, if all the bits of the first priority control register $16_1$ are "0" in step S22, the selecting physical layer address output circuit 12 writes again the priority information of the corresponding physical layer devices ($2_1$ and $2_4$ in the example of FIG. 4) to the first priority control register $16_1$ on the basis of the content of the priority information register 11 (step S26).

After completion of step S26, the processing goes into step S27, in which the selecting physical layer address output circuit 12 ascertains whether or not all the bits of the second priority control register $16_2$ are "0". If all the bits of the second priority control register $16_2$ are not "0", the selecting physical layer address output circuit 12 ascertains whether or not the physical layer device corresponding to the least significant bit of the "1"—written bits can execute the cell transfer (step S28). when the result of the processing in the step S28 indicates that the cell transfer is possible, the selecting physical layer address output circuit 12 outputs the address of the corresponding physical layer device (first physical layer address), so that the cell transfer is executed between the ATM layer device and the corresponding physical layer device (step S29). On the other hand, when the cell transfer is not possible, or when the processing in step S29 is completed, the selecting physical layer address output circuit 12 rewrites the least significant bit of the "1"— written bits in the second priority control register $16_2$ to "0" (step S30), and the processing returns to step S22.

On the other hand, if all the bits of the second priority control register $16_2$ are "0" in step S27, the selecting physical layer address output circuit 12 writes again the priority information of the corresponding physical layer devices (22 and 23 in the example of FIG. 4) to the second priority control register $16_2$ on the basis of the content of the priority information register 11 (step S31).

After completion of step S31, the processing goes into step S32, in which the selecting physical layer address output circuit 12 ascertains whether or not all the bits of the third priority control register $16_3$ are "0". If all the bits of the third priority control register $16_3$ are not "0", the selecting physical layer address output circuit 12 ascertains whether or not the physical layer device corresponding to the least significant bit of the "1"—written bits can execute the cell transfer (step S33). When the result of the processing in step S33 indicates that the cell transfer is possible, the selecting physical layer address output circuit 12 outputs the address of the corresponding physical layer device (first physical layer address), so that the cell transfer is executed between the ATM layer device and the corresponding physical layer device (step S34). On the other hand, when the cell transfer is not possible, or when the processing in step S34 is completed, the selecting physical layer address output circuit 12 rewrites the least significant bit of the "1"—written bits in the third priority control register 16₃ to "0" (step S35), and the processing returns to step S22.

On the other hand, if all the bits of the third priority control register 16₃ are "0" in step S32, the selecting physical layer address output circuit 12 writes again the priority information of the corresponding physical layer devices (2₅ to 2n in the example of FIG. 4) to the third priority control register 16₃ on the basis of the content of the priority information register 11 (step S36), and the processing returns to step S22, so that the processing of steps S22 to S36 is repeated.

With the above mentioned processing, the selecting physical layer address output circuit 12 outputs the physical layer address in the order determined by the priority-based hierarchical combination of a high priority loop comprising the physical layer devices having the highest priority, a middle priority loop comprising the physical layer devices having the middle priority, and a low priority loop comprising the physical layer devices having the lowest priority, as shown in FIG. 4.

As seen from above, an ATM layer device in accordance with the present invention holds the priority information indicating the previously set priority level of each of a plurality of physical layer devices and selects the physical layer device that should execute the cell transfer in a predetermined order in accordance with the priority information. Therefore, the higher the priority level of the physical layer device, the larger the opportunity of the selection of the physical layer device becomes, so that the data transfer amount per unit of time, of the physical layer device having the high priority level, can be increased.

In particular, by giving a high priority to a physical layer device having a high transmission rate, it is possible to suppress the overflow of the receiving buffer in the physical layer device having the high transmission rate.

The invention has thus been shown and described with reference to the specific embodiments. However, it should be noted that the present invention is in no way limited to the details of the illustrated structures but changes and modifications may be made within the scope of the appended claims.

What is claimed is:

1. An ATM layer device controlling method comprising the steps of:

holding priority information indicating a previously set priority level of each of a plurality of physical layer devices realizing the function of a physical layer;

selecting the physical layer device that should execute a cell transfer, in a predetermined order in accordance with the priority information; and executing said cell transfer between an ATM layer device and the selected physical layer device designated by said address;

wherein said selecting step further comprises:

outputting an address corresponding to the physical layer device that should execute the cell transfer, in accordance with the priority information; and responding to a cell transfer enable notify signal indicating that the cell transfer is possible, outputted from the physical layer device designated by said address, so as to output the address of the physical layer device that should execute the cell transfer.

2. A method as claimed in claim 1, wherein the larger the transmission rate of the physical layer device, the higher the priority level of the physical layer device.

3. An ATM layer device comprising:

a priority information register holding priority information indicating a previously set priority level of each of a plurality of physical layer devices realizing the function of a physical layer;

a selecting physical layer address output circuit for outputting an address corresponding to the physical layer device that should execute a cell transfer, in a predetermined order in accordance with the priority information;

a control circuit for executing said cell transfer between an ATM layer device and the physical layer device designated by said address; and a polling physical layer address output circuit for outputting, in said predetermined order, the address of the physical layer device that should execute the cell transfer, selected in accordance with the priority information;

wherein said selecting physical layer address output circuit responds to a cell transfer enable notify signal indicating that the cell transfer is possible, outputted from the physical layer device designated from said address, so as to output the address of the physical layer device that should execute the cell transfer.

4. An ATM layer device as claimed in claim 3, wherein said selecting physical layer address output circuit includes a plurality of priority control registers for holding the information of said physical layer devices in units of different levels of priority.

5. An ATM layer device as claimed in claim 4, wherein said polling physical layer address output circuit includes a plurality of priority control registers for holding the information of said physical layer devices in units of different levels of priority.

6. An ATM layer device as claimed in claim 5, wherein the larger the transmission rate of the physical layer device, the higher the priority level of the physical layer device.

7. An ATM layer device as claimed in claim 4, wherein the larger the transmission rate of the physical layer device, the higher the priority level of the physical layer device.

8. An ATM layer device as claimed in claim 3, wherein the larger the transmission rate of the physical layer device, the higher the priority level of the physical layer device.

9. An ATM layer device as claimed in claim 3, wherein said polling physical layer address output circuit includes a plurality of priority control registers for holding the information of said physical layer devices in units of different levels of priority.

10. An ATM layer device as claimed in claim 9, wherein the larger the transmission rate of the physical layer device, the higher the priority level of the physical layer device.

* * * * *

UNITED STATES PATENT AND TRADEMARK OFFICE
CERTIFICATE OF CORRECTION

PATENT NO.    : 6,510,155 B1
DATED         : January 21, 2003
INVENTOR(S)   : Sudo It is certified that error appears in the above-identified patent and that said Letters Patent is hereby corrected as shown below:

<u>Title page,</u>
Item [30], Foreign Application Priority Data, should be -- JP January 26, 1998 10-12852 --.

Signed and Sealed this

Thirteenth Day of July, 2004

JON W. DUDAS
*Acting Director of the United States Patent and Trademark Office*